Jan. 28, 1936.   N. A. PALMGREN   2,029,274

RADIAL PLAIN BEARING

Filed Dec. 7, 1934

INVENTOR
Nils Arvid Palmgren
BY
his ATTORNEY

Patented Jan. 28, 1936

2,029,274

UNITED STATES PATENT OFFICE 2,029,274

RADIAL PLAIN BEARING

Nils Arvid Palmgren, Goteborg, Sweden, assignor to Aktiébolaget Svenska Kullagerfabriken, Goteborg, Sweden, a corporation of Sweden Application December 7, 1934, Serial No. 756,541
In Sweden January 30, 1934

4 Claims. (Cl. 308—72)

With all kinds of radial plain bearings it is desirable that the bearing be designed in such a manner as to provide an equal distribution of pressure along the whole width of the sliding surface, or, in other words, that the bearing be designed for self-alignment. Many suggestions have been made with respect hereto. It has been proposed to make the outer ring spherical externally or to provide the bearing housing with a narrow supporting surface located near the central plane of the bearing ring. It has also been proposed to support the outer ring or the bearing housing on a spherical seat or to provide the bearing with a so-called spherical socket ring. These measures are, however, insufficient for several reasons, either because they cause too much friction counteracting the self-alignment, or because they require extra play rendering the centreing of the bearing shaft less accurate.

The most effective means of obtaining satisfactory self-alignment is to make the sliding surface spherical in itself. This is an easy matter in block bearings but in the case of annular bearings with continuous circular sliding surfaces means must be provided for the assembly of the bearing, whereby the arrangement must be such as to leave the sliding surfaces of the two bearing rings unbroken.

In the present invention which relates to an annular bearing this problem is solved by making the outer bearing ring thin enough to permit it to be passed onto the inner ring without the aid of recesses in the sliding surface of either of the bearing rings while the rings are perpendicular to each other.

Figure 1:
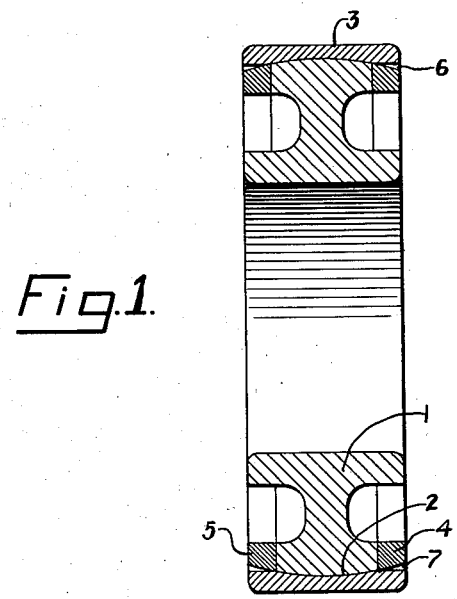
Figure 2:
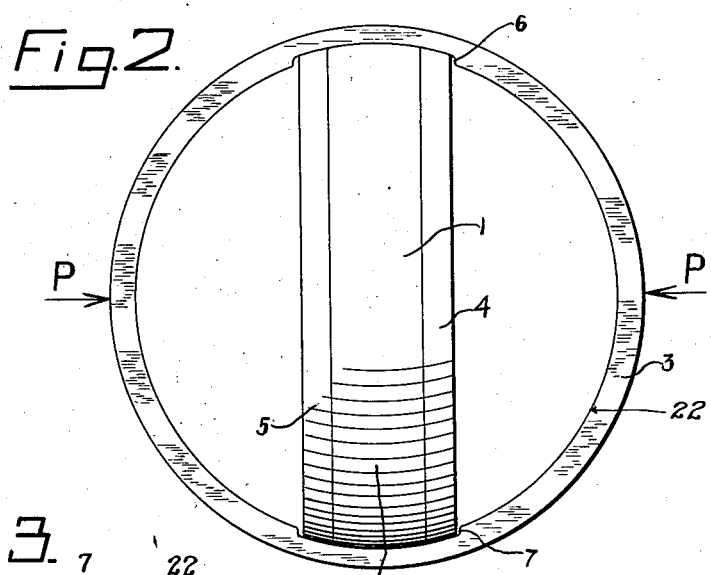
Figure 3:
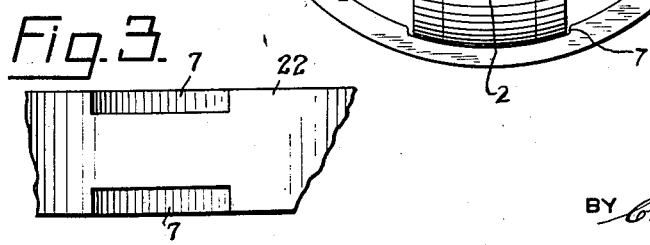

The invention is illustrated in the accompanying drawing which shows one embodiment of the invention. Figure 1 is a section in an axial plane through a bearing according to this embodiment. Figure 2 shows the relative positions of the bearing rings during the insertion of the inner ring in the outer one, and Figure 3 is a fragmental view of the inner sliding surface of the outer ring.

The inner ring 1 has an outer spherical uninterrupted sliding surface 2. Surrounding the inner ring is an outer ring 3 which has an inner uninterrupted spherical sliding surface 22 fitting the sliding surface 2. Two side discs or rings 4, 5 are located in the outer ring and bear against an extension of the spherical sliding surface of the outer ring. It is evident that it would be impossible to assemble the bearing if the rings were inflexible. The outer ring 3 is provided with two recesses 6, 7 in its inner periphery extending from the side face of the ring to the limit of the sliding surface proper. If the outer ring 3 and the inner ring 1 with the two side discs 4 and 5 are placed in perpendicular relation, as shown in Figure 2, the forces P are simultaneously applied radially against the outer ring the latter will be sufficiently deformed ovally to allow the inner ring 1 and the side discs 4, 5 to be inserted in central position within the outer ring. The forces P are then removed, and the outer ring resumes its circular form. The inner ring and the side discs can then be rotated into the position shown in Figure 1. The recesses 6, 7 serve the purpose of reducing the amount of deformation required, and, since they do not extend into the sliding surface of the outer ring, they cause no reduction of the carrying capacity of the bearing.

Having thus described my invention, I claim and desire to secure by Letters Patent:

1. A radial plain bearing comprising an inner bearing ring having a spherical unbroken sliding surface on its outer periphery and an outer bearing ring having a spherical unbroken sliding surface fitting the inner bearing ring, the outer ring being of greater width than the width of the inner ring, there being recesses formed in the inner periphery of the outer bearing ring extending inwardly from the side face of the ring for facilitating the insertion of the inner ring, the outer ring being thin enough to deform ovally for permitting its passage onto the inner ring, while in a position perpendicular to the latter.

2. A radial plain bearing comprising an inner bearing ring having a spherical unbroken sliding surface on its outer periphery and an outer bearing ring having a spherical unbroken sliding surface fitting the inner bearing ring, the outer ring being of greater width than the width of the inner ring, discs mounted at the respective sides of the inner bearing ring and having spherical edges for engaging the spherical surface of the outer ring, there being recesses formed in the inner periphery of the outer bearing ring extending inwardly from the side face of the ring, the outer ring being thin enough to deform ovally for facilitating its passage onto the inner ring, while in a position perpendicular to the latter.

3. A radial plain bearing comprising an inner bearing ring having a spherical unbroken sliding surface on its outer periphery and an outer bearing ring having a spherical unbroken sliding surface fitting the inner bearing ring, the outer ring being of greater width than the width of the inner ring, there being recesses formed in the inner periphey of the outer bearing ring extending inwardly from the side face of the ring to the limit of the said sliding surface for facilitating the insertion of the inner ring, the outer ring being thin enough to deform ovally for facilitating its passage onto the inner ring, while in a position perpendicular to the latter.

4. A radial plain bearing comprising an inner bearing ring having a spherical unbroken sliding surface on its outer periphery and an outer bearing ring having a spherical unbroken sliding surface fitting the inner bearing ring, there being discs mounted at the respective sides of the inner bearing ring and having spherical edges engaging the spherical surface of the outer ring, the outer ring being of greater width than the width of the inner ring, there being recesses formed in the inner periphery of the outer bearing ring extending inwardly from the side face of the ring to the limit of the said sliding surface for facilitating the insertion of the inner ring and discs, the outer ring being thin enough to deform ovally for facilitating its passage onto the inner ring and discs while in a position perpendicular thereto.

NILS ARVID PALMGREN.